(12) United States Patent
Taguchi et al.

(10) Patent No.: US 10,873,796 B2
(45) Date of Patent: Dec. 22, 2020

(54) IMAGE FORMING APPARATUS

(71) Applicant: SHARP KABUSHIKI KAISHA, Sakai (JP)

(72) Inventors: Noriaki Taguchi, Sakai (JP); Yasushi Nakamura, Sakai (JP); Shinichi Takeda, Sakai (JP); Hiroki Kanemitsu, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/202,016

(22) Filed: Nov. 27, 2018

(65) Prior Publication Data

US 2019/0166416 A1    May 30, 2019

(30) Foreign Application Priority Data

Nov. 30, 2017   (JP) .................. 2017-230620

(51) Int. Cl.
*H04R 1/02*      (2006.01)
*H04N 1/00*      (2006.01)
*H04R 1/32*      (2006.01)

(52) U.S. Cl.
CPC ......... *H04R 1/025* (2013.01); *H04N 1/00488* (2013.01); *H04R 1/021* (2013.01); *H04R 1/028* (2013.01); *H04R 1/023* (2013.01); *H04R 1/323* (2013.01)

(58) Field of Classification Search
CPC .......... H04R 1/02; H04R 1/025; H04R 1/026; H04N 1/00488
See application file for complete search history.

(56) References Cited

U.S. PATENT DOCUMENTS

| | | | | |
|---|---|---|---|---|
| 6,415,035 | B1* | 7/2002 | Shin .................. | G06F 1/1616 361/679.23 |
| 6,807,053 | B2* | 10/2004 | An .................... | G06F 1/1688 361/679.55 |
| 7,346,181 | B2* | 3/2008 | Rivera ............... | H04R 1/023 381/391 |
| 7,576,983 | B2* | 8/2009 | Yamaguchi ......... | G06F 1/1616 181/150 |
| 2002/0057816 | A1* | 5/2002 | Kelly ................. | H04M 1/03 381/353 |
| 2008/0247593 | A1* | 10/2008 | Sprinkle ............. | H04R 1/025 381/387 |
| 2009/0174213 | A1* | 7/2009 | Robertson .......... | B62D 25/24 296/70 |
| 2019/0111820 | A1* | 4/2019 | Subat ................ | B60N 2/01 |

FOREIGN PATENT DOCUMENTS

| | | |
|---|---|---|
| CN | 206364919 U | 7/2017 |
| JP | 2004-126334 A | 4/2004 |
| JP | 2010162779 A * | 7/2010 |
| JP | 2014-157272 A | 8/2014 |

* cited by examiner

*Primary Examiner* — Fan S Tsang
*Assistant Examiner* — Angelica M McKinney
(74) *Attorney, Agent, or Firm* — ScienBiziP, P.C.

(57) ABSTRACT

An image forming apparatus has a speaker that is stored inside a housing and includes an attachment guide to which the speaker is attached on a housing front surface. The attachment guide has at least one angle deciding portion which inclines a front surface of the speaker relative to the housing front surface.

6 Claims, 5 Drawing Sheets

FIG. 1

IMAGE FORMING APPARATUS

BACKGROUND

1. Field

The present disclosure relates to an image forming apparatus in which a speaker is stored inside a housing.

2. Description of the Related Art in image forming apparatuses installed in offices, homes, and the like, a speaker that is mounted has generated beeps or the like to perform various notification to a user. In recent, years, since the image forming apparatuses have achieved multifunctionality and a form of sound that is generated has changed, the image forming apparatuses have been demanded to generate sound that is easily heard by the user and has high quality.

In view of circumstances described above, for example, Japanese Unexamined Patent Application Publication No. 2014-157272 proposes an image forming apparatus capable of generating nondirectional sound to inform many users, when the image forming apparatus is installed in a wide space. Moreover, apparatuses provided with a speaker are not limited to image forming apparatuses, and, for example, Japanese Unexamined Patent Application Publication No. 2004-1265334 proposes a camera that has a structure to prevent sound leakage without including a speaker box.

In the image forming apparatus described in Japanese Unexamined Patent Application Publication No. 2014-157272, a speaker unit provided with an enclosure is arranged inside an exterior cover of an apparatus body. In the image forming apparatus, the exterior cover is vibrated by the speaker to serve as a nondirectional sound source, so that there is a problem that it is difficult for a specific target such as a user who operates the image forming apparatus to easily hear sound.

The camera described in Japanese Unexamined Patent Application. Publication No. 2004-126334 includes a finder box provided on a top of a camera body and a speaker attached to the finder box. In the camera, the speaker is attached from an outside of the finder box, and therefore dust or a falling object may enter into the speaker.

It is desirable to provide an image forming apparatus capable of holding a speaker with a simple structure and allows a user to easily hear sound.

SUMMARY

An image forming apparatus according to the disclosure is an image forming apparatus in which a speaker is stored inside a housing and which includes an attachment guide to which the speaker is attached on an inside surface of the housing. The attachment guide has at least one angle deciding portion which inclines a front surface of the speaker relative to the inside surface of the housing.

BRIEF DESCRIPTION OF THE DRAWINGS

FIG. 1 is a schematic side view of an image forming apparatus according to a first embodiment of the disclosure;

DESCRIPTION OF THE EMBODIMENTS

First Embodiment

Figure 2:
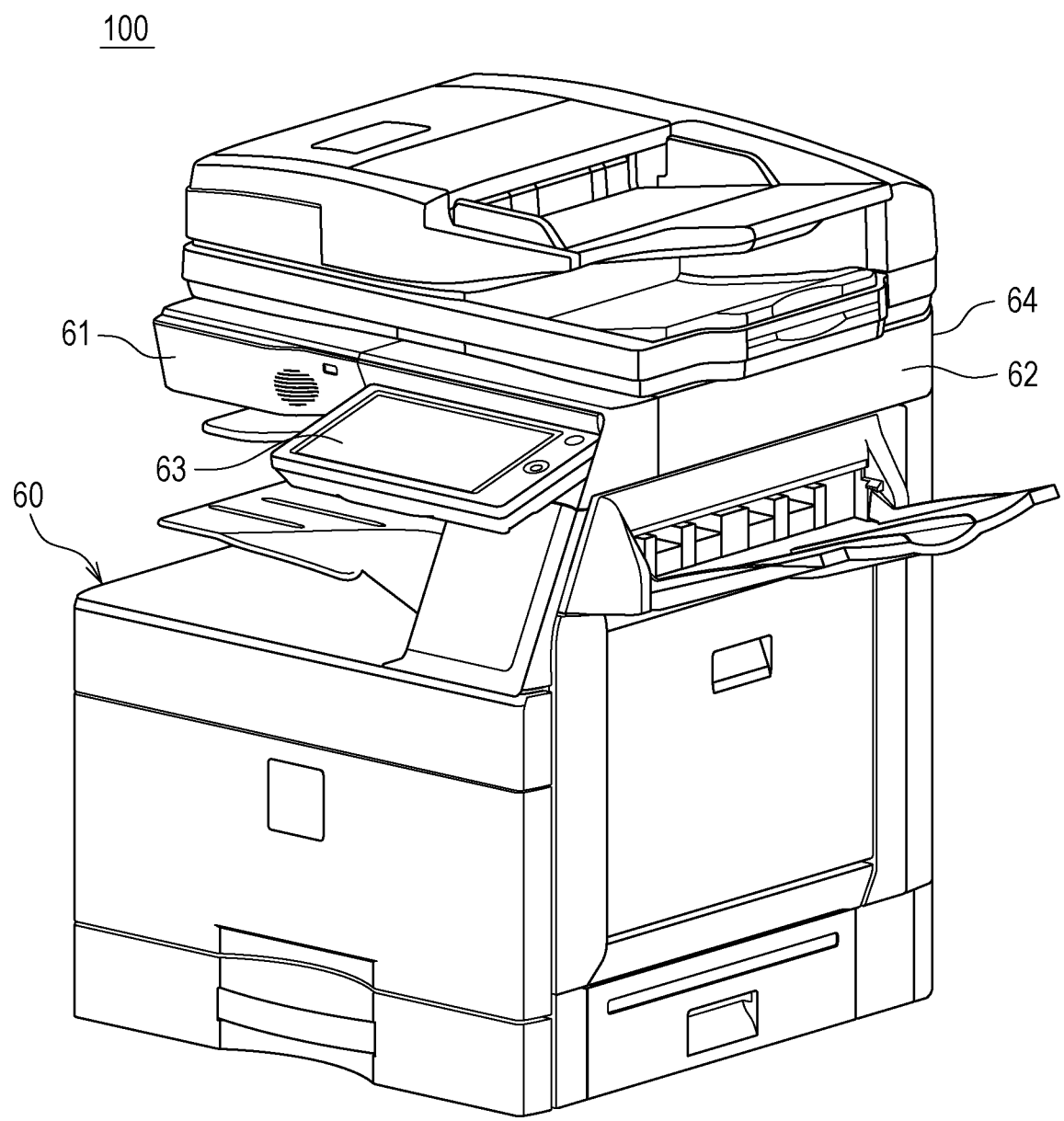
FIG. 2 is an external perspective view illustrating an external appearance of the image forming apparatus illustrated in FIG. 1.

An image forming apparatus according to a first embodiment of the disclosure will be described below with reference to the drawings.

Figure 1:
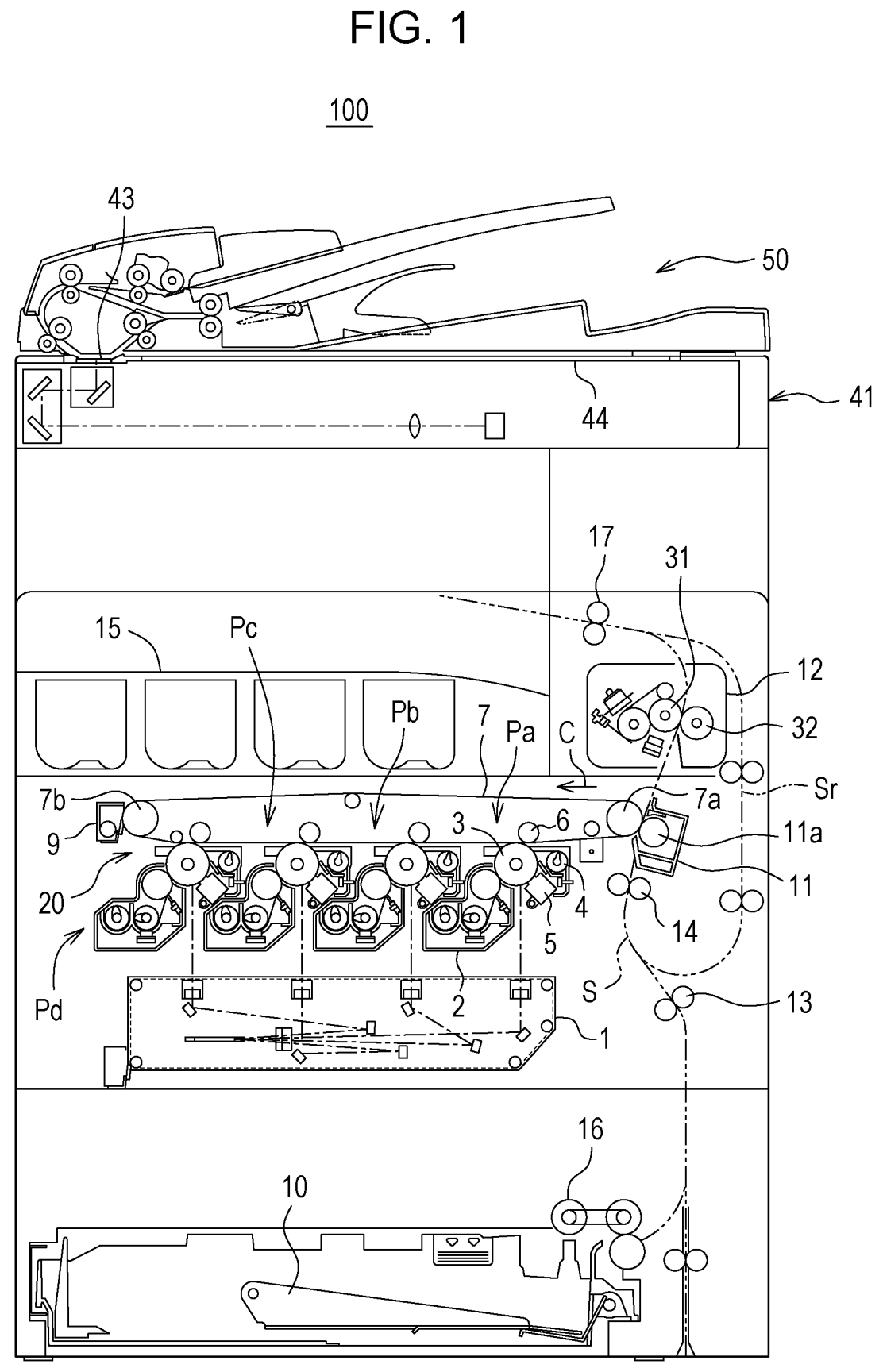

FIG. 1 is a schematic side view of the image forming apparatus according to the first embodiment of the disclosure.

An image forming apparatus 100 is a multifunctional peripheral having a scanning function, a copying function, a printing function, a facsimile function, and the like, and transmits an image of a document read by an image reading device to outside (corresponding to the scanning function) and records the image of the read document or an image received from the outside on a sheet in colors or in monochrome (corresponding to the copying function, the printing function and the facsimile function).

On an upper side of an image reading unit 41, a document conveyance unit 50 (ADF) which is supported so as to be freely opened and closed relative to the image reading unit 41 is provided. When the document conveyance unit 50 is opened, a document platen 44 above the image reading unit 41 is exposed in such a manner that the document is able to be placed thereon manually. Moreover, the document conveyance unit 50 automatically conveys the placed document onto a document transmitting unit 43 provided in the image reading unit 41. The image reading unit 41 reads the document that is placed or the document that is conveyed by the document conveyance unit 50 and generates image data.

The image forming apparatus 100 includes an optical scanning device 1, a development device 2, a photoreceptor drum 3 (an example of a photoreceptor), a drum cleaning device 4, a charger 5, an intermediate transfer belt 7, a fixing unit 12, a sheet conveyance path S, a sheet feed cassette 10, a stacking tray 15, and the like.

The image forming apparatus 100 handles image data corresponding to a color image using colors of black (K), cyan. (C), magenta (M), and yellow (Y) or corresponding to a monochrome image using a single color (e.g., black). In order to form four kinds of toner images, an image transfer unit 20 of the image forming apparatus 100 includes four development devices 2, four photoreceptor drums 3, four drum cleaning devices 4, and four chargers 5 so as to be associated with black, cyan, magenta, and yellow. Thus, four image stations Pa, Pb, Pc, and Pd are formed.

The drum cleaning device 4 removes and collects residual toner on a surface of the photoreceptor drum 3. The charger 5 charges the surface of the photoreceptor drum 3 at a predetermined potential uniformly. The optical scanning device 1 causes the surface of the photoreceptor drum 3 to be exposed to light so as to form an electrostatic latent image. The development device 2 develops the electrostatic latent image on the surface of the photoreceptor drum 3 so as to form a toner image on the surface of the photoreceptor drum 3. By the aforementioned series of operations, each toner image of the corresponding color is formed on the corresponding surface of the photoreceptor drum 3.

Above the photoreceptor drum 3, an intermediate transfer roller 6 is disposed with the intermediate transfer belt 7 in between. The intermediate transfer belt 7 is stretched by a transfer drive roller 7a and a transfer driven roller 7b and circularly moves in a direction indicated by an arrow C so that a belt cleaning device 9 removes and collects residual toner. The toner image of each color formed on the corresponding surface of the photoreceptor drum 3 is sequentially transferred and superimposed to each other, so that a color toner image is formed on a surface of the intermediate transfer belt 7.

A nip area is formed between a transfer roller 11a of a secondary transfer unit 11 and the intermediate transfer belt 7 and a sheet conveyed through the sheet conveyance path S is nipped by the nip area to be conveyed. The toner image on the surface of the intermediate transfer belt 7 is transferred to the sheet when the sheet passes through the nip area, and then the sheet is conveyed to the fixing unit 12.

The fixing unit 12 includes a fixing roller 31 and a pressure roller 32 that rotate while sandwiching the sheet. In the fixing unit 12, the sheet on which the toner image is transferred is sandwiched between the fixing roller 31 and the pressure roller 32 so that the sheet is heated and pressurized, and thus the toner image is fixed on the sheet.

The sheet feed cassette 10 is a cassette in which a sheet to be used for image formation is stacked, and is provided below the optical scanning device 1. The sheet is drawn out from the sheet feed cassette 10 by a sheet pickup roller 16, conveyed through the sheet conveyance path S, goes through the secondary transfer unit 11 and the fixing unit 12, and is discharged to the stacking tray 15 via discharge rollers 17. The sheet conveyance path S is provided with sheet registration rollers 14 that temporarily stop the sheet to align a leading end of the sheet and then start the conveyance of the sheet at a timing in synchronization with a transfer timing of the color toner image in the nip area between the intermediate transfer belt 7 and the transfer roller 11a, conveyance rollers 13 that promote the conveyance of the sheet, and the discharge rollers 17.

Note that, the number of sheet feed cassettes 10 is one in FIG. 1, but is not limited thereto and a plurality of sheet feed cassettes 10 may be provided so that different kinds of sheets may be stacked in each of them.

When an image is formed not only on a front surface of the sheet but also on a rear surface of the sheet, the sheet is conveyed in a reverse direction from the discharge rollers 17 to a sheet reverse path Sr where the sheet is turned over and guided again to the registration rollers 14. Then, an image is formed on the rear surface similarly to the front surface thereof and the sheet is discharged to the stacking tray 15.

FIG. 2 is an external perspective view illustrating an external appearance of the image forming apparatus illustrated in FIG. 1.

A housing 60 of the image forming apparatus 100 has a substantially rectangular parallelepiped shape and the document conveyance unit 50 and the image reading unit 41 are disposed above the housing 60. In an upper part of the image forming apparatus 100, an operation panel 63 is disposed in a near side of the image reading unit 41. The operation panel 63 is provided with various keys operated by a user and a liquid crystal display. Below the image reading unit 41, the stacking tray 15 is disposed.

Among side surfaces of the housing 60, a surface on which the operation panel 63 is provided is a housing front surface 61, a surface facing the housing front surface 61 is a housing back surface 64, and the other side surfaces that face each other are housing side surfaces 62. Hereinafter, for description, a direction in which the housing side surfaces 62 face each other is also called a width direction X, a direction in which the housing front surface 61 faces the housing back surface 64 is also called a depth direction Y, and a direction vertical to the width direction X and the depth direction Y is also called a height direction Z.

In the image forming apparatus 100, a speaker 70 (refer to FIG. 4 described below) is stored inside the housing 60 and the speaker 70 is attached to the housing front surface 61 in the present embodiment.

Figure 3:
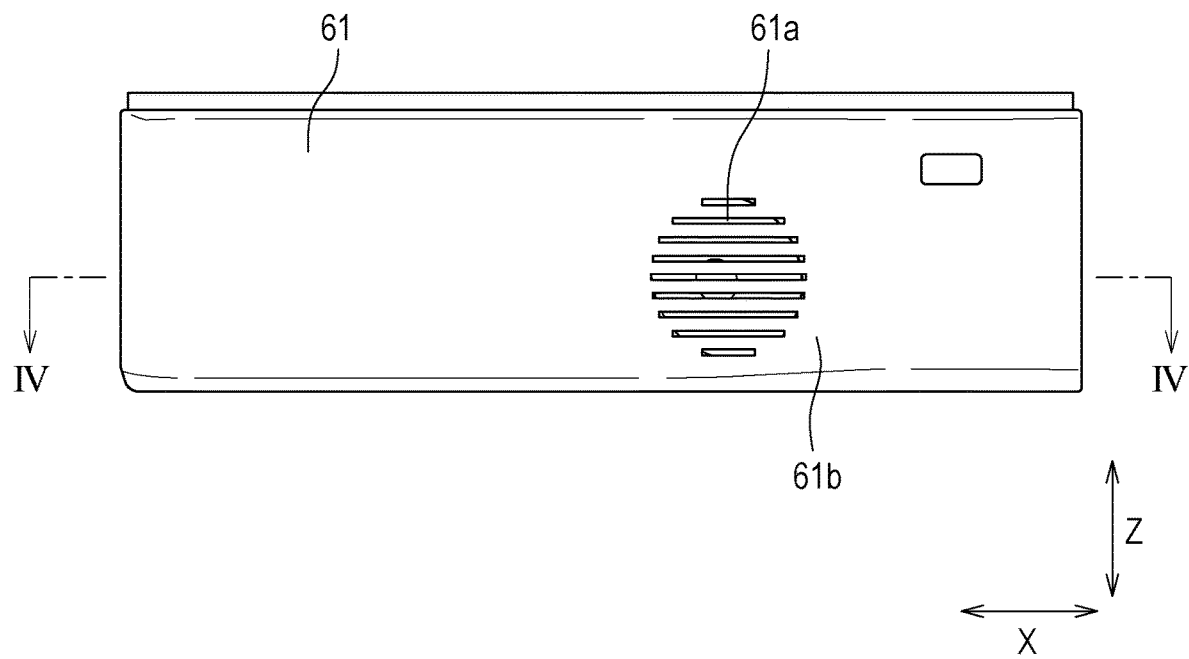
FIG. 3 is an enlarged front view illustrating a part of a housing front surface on an enlarged scale.
Figure 4:
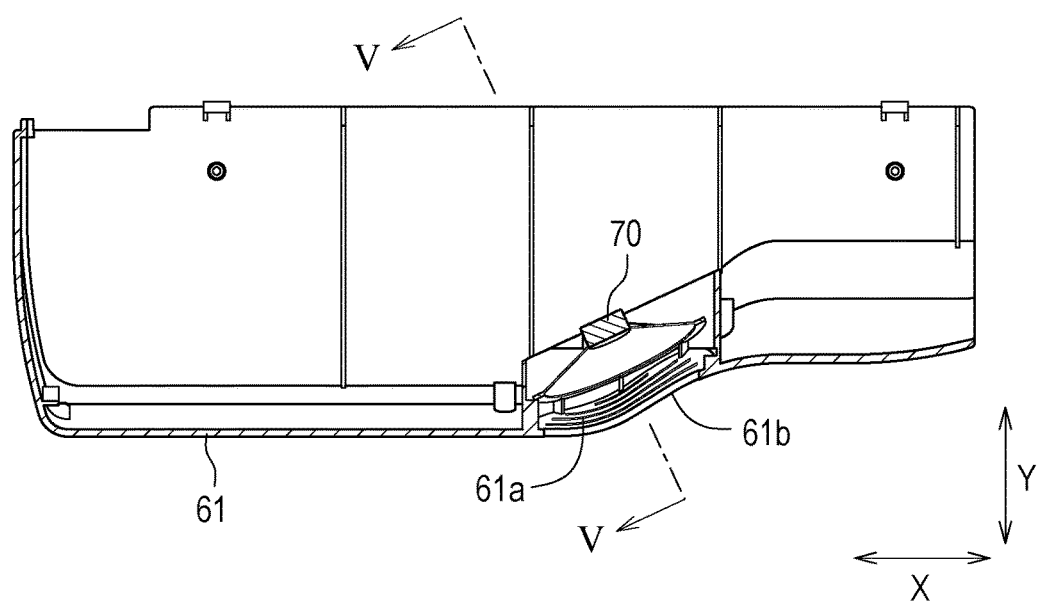
FIG. 4 is a sectional top view taken along arrows IV-IV in FIG. 3.
Figure 5:
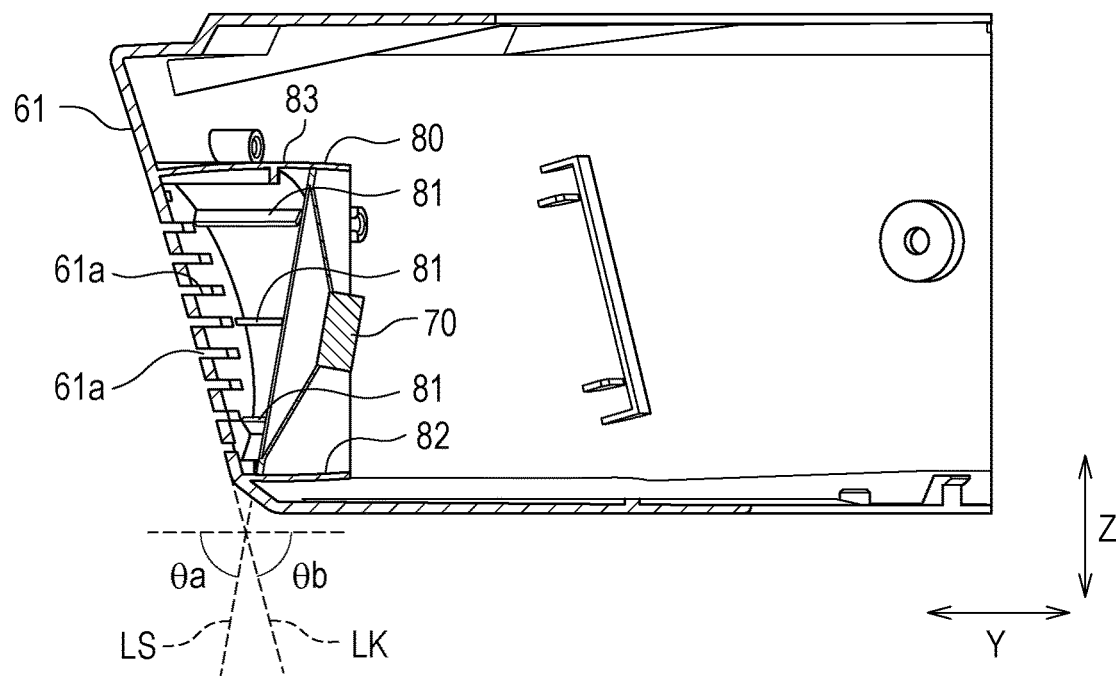
FIG. 5 is a sectional side view taken along arrows V-V in FIG. 4.
Figure 6:
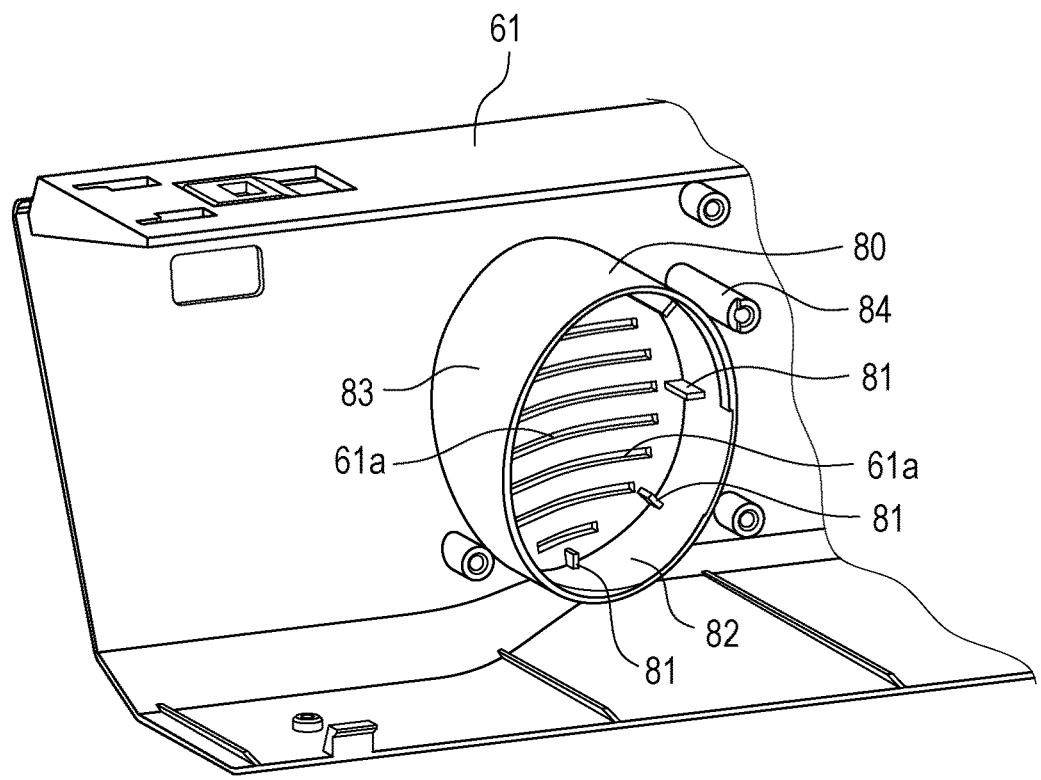
FIG. 6 is an enlarged perspective view illustrating a state where the housing front surface is viewed from an inside surface side.

FIG. 3 is an enlarged front view illustrating a part of the housing front surface on an enlarged scale, FIG. 4 is a sectional top view taken along arrows IV-IV in FIG. 3, FIG. 5 is a sectional side view taken along arrows V-V in FIG. 4, and FIG. 6 is an enlarged perspective view illustrating a state where the housing front surface is viewed from an inside surface side. Note that, FIG. 6 illustrates a state where the speaker 70 is removed, in order to make the figure easy to understand.

FIG. 3 illustrates an exterior cover that constitutes a part of the housing front surface 61 and illustrates a portion (the left of the operation panel 63 in FIG. 2) of the housing front surface 61, which is adjacent to the operation panel 63 in the width direction X. The exterior cover illustrated in FIG. 3 is formed so as to be freely separated from the housing 60 and has a structure in which the exterior cover is fitted in assembling of the image forming apparatus 100. On an inside surface of the exterior cover, an attachment guide 80 to which the speaker 70 is attached is provided. That is, the speaker 70 is arranged in a vicinity of the operation panel 63 and at the substantially same height as the operation panel 63.

The attachment guide 80 protrudes toward the inside of the housing 60 from the inside surface of the housing front surface 61. The attachment guide 80 is formed in a substantially cylindrical shape when the housing front surface 61 is viewed from the inside surface side (refer to FIG. 6) and has a structure to store the speaker 70 in the inside thereof. In other words, the attachment guide 80 is formed with a guide inside surface 62 along an outer edge of the speaker 70.

At least one angle deciding portion 81 in contact with the outer edge of a front surface of the speaker 70 is formed on the guide inside surface 82. A plurality of angle deciding portions 81 is provided on the guide inside surface 82 and is appropriately set to have different lengths extending to the inside of the housing 60. Specifically, the angle deciding portion 81 provided at an upper side in the height direction Z has an end positioned closer to the inside (the right in FIG. 5) of the housing 60, and the angle deciding portion 81 provided at a lower side in the height direction Z has an end positioned closer to the housing front surface 61 (the left in FIG. 5). As a result of attaching the speaker 70 so as to contact the angle deciding portion 81, the front surface of the speaker 70 is inclined so as to be separated from the housing front surface 61 toward the upper side in the height direction Z A speaker auxiliary line LS illustrated in FIG. 5 is a straight line that is extended along the front surface of the speaker 70 and a speaker angle θa indicates an angle of the front surface of the speaker 70 relative to a horizontal direction (depth direction Y in FIG. 5).

A screw engagement portion 84 for attaching an enclosure 90 (refer to FIG. 7) that will be described below may be appropriately formed around the attachment guide 80. The screw engagement portion 84 is provided with a concave part where a screw groove is formed and enables fixation of the enclosure 90 by inserting a screw.

On the housing front surface 61, a plurality of sound holes 61a that penetrates from the inside to the outside is formed. Each of the sound holes 61a has a long rectangular shape and has a longitudinal direction set along the width direction X. A plurality of sound holes 61a is provided side by side in the height direction Z and arranged in an area surrounded by the attachment guide 80. Accordingly, in a structure in which the sound holes 61a are provided, sound generated from the speaker 70 escapes to the outside through the sound holes 61a, thus making it possible for the user to easily hear the sound. In addition, each of the sound holes 61a is a long hole which has the substantially long rectangular shape in which any one side is formed to be longer than a side adjacent thereto, thus achieving a structure in which a part that is open is wide and a falling object or the like is less likely to enter into the inside.

As illustrated in FIG. 4, a slope 61b that is inclined relative to the width direction X is provided on the housing front surface 61. The slope 61b is inclined so that a side (right side in FIG. 4) closer to the operation panel 63 enters into the inside of the housing 60. That is, the slope 61b slightly faces toward the operation panel 63 relative to the front surface of the housing 60. In addition, the attachment guide 80 and the sound holes 61a described above are provided in the slope 61b.

The housing front surface 61 has a structure to be inclined also relative to the height direction as illustrated in FIG. 5. Specifically, the housing front surface 61 is inclined so as to protrude to the outside toward the upper side in the height direction Z. A housing auxiliary line LK illustrated in FIG. 5 is a straight line that is extended along the housing front surface 61 and a housing angle θb indicates an angle of the housing front surface 61 relative to the horizontal direction (depth direction Y in FIG. 5). A part of the housing front surface 61, in which the attachment guide 80 is provided, may be inclined relative to the height direction 7, and a slope is provided in the exterior cover in the present embodiment. Since the housing front surface 61 is inclined as described above, dust, a falling object, or the like is able to be inhibited from entering into the inside through the sound holes 61a.

In the present embodiment, the structure in which the speaker 70 is directly attached to the housing 60 makes it possible to simplify, for example, a member for holding the speaker 70. Moreover, by appropriately setting a direction of the speaker 70, the user is able to easily hear the sound.

The speaker 70 is attached so as to be inclined toward the upper side, and therefore the user is able to easily hear sound above the image forming apparatus 100. The image forming apparatus 100 is designed to be operated in a state of being looked down from the upper side in many cases and thus is desirably configured to have directivity to the upper side. At this time, a structure in which sound is generated from a vicinity of the operation panel 63 makes possible to give the user who operates the image forming apparatus 100 a deep impression that the sound is generated from the image forming apparatus 100.

When the speaker 70 is attached to the attachment guide 80, a space in a back surface of the speaker 70 is desirably enclosed. Thus, a structure where a space enclosed by the exterior cover illustrated in FIG. 3 and a wall surface inside the housing 60, which faces the exterior cover, are formed so that sound is not leaked is desirable.

Second Embodiment

Next, an image forming apparatus according to a second embodiment of the disclosure will be described with reference to the drawing. Note that, a structure of the image forming apparatus according to the second embodiment is substantially similar to that of the first embodiment, and therefore description and a drawing thereof will be omitted.

Figure 7:
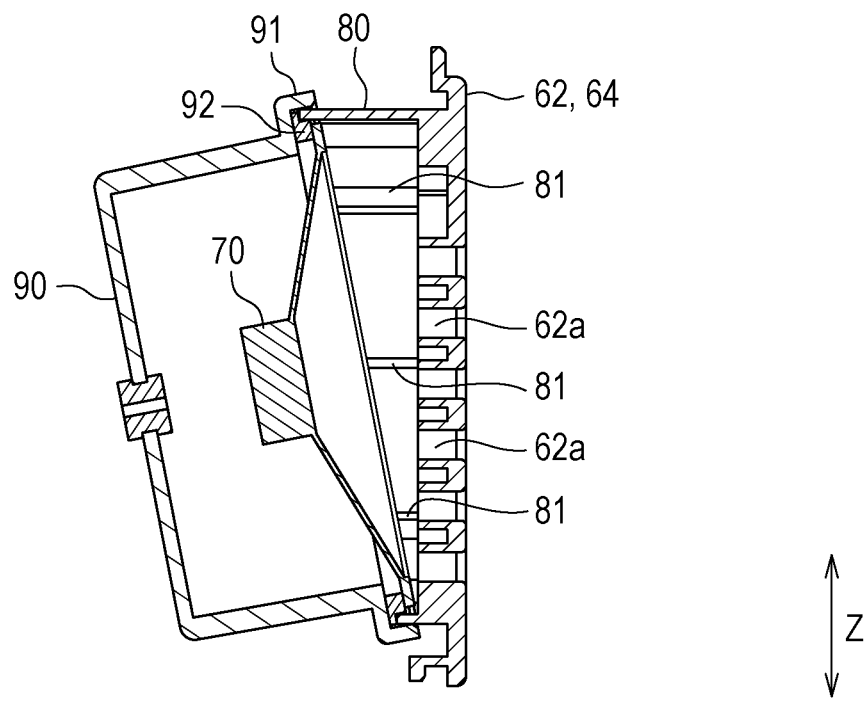
FIG. 7 is an enlarged sectional view illustrating a vicinity of a speaker in a second embodiment of the disclosure on an enlarged scale.

FIG. 7 is an enlarged sectional view illustrating a vicinity of a speaker in the second embodiment of the disclosure on an enlarged scale.

The second embodiment is different from the first embodiment in that the speaker 70 is attached to the housing side surface 62 or the housing back surface 64. At a portion where the speaker 70 is attached, the attachment guide 80 is provided similarly to the first embodiment. The housing side surface 62 or the housing back surface 64 is set as a surface parallel to the height direction Z. Note that, the housing side surface 62 or the housing back surface 64 may be set to be inclined relative to the width direction X or the depth direction Y.

Each of the angle deciding portions 81 is provided on the guide inside surface 82 of the attachment guide 80, substantially similarly to the first embodiment, and a structure in which the speaker 70 is inclined relative to the housing side surface 62 or the housing back surface 64 by being attached along each of the angle deciding portions 81 is provided. Similarly to the housing front surface 61, at least one sound hole 62a is provided on the housing side surface 62 or the housing back surface 64.

In the second embodiment, the enclosure 90 is attached to a side of the back surface of the speaker 70. The enclosure 90 has a bowl shape in which a side facing the back surface of the speaker 70 is open, and at an open end, a contact portion 91 whose diameter is increased is provided. The speaker 70 has a front surface side of an outer edge fixed by the angle deciding portion 81 and has a back surface side of the outer edge fixed to the contact portion 91 via an elastic body 92 that has an annular shape. Moreover, a leading end of the contact portion 91 extends along a guide outside surface 83 of the attachment guide 80. Note that, a hole or the like through which a wire connected to the speaker 70 passes may be formed in the enclosure 90, and a gap between the wire and the hole may be closed by a sponge or the like.

In this manner, the back surface of the speaker 70 is enclosed by the enclosure 90, thus making it possible to inhibit sound from being muffled and getting hard to be heard. That is, in the speaker 70, antiphase sound is generated from the back surface against sound that is generated from the front surface. In a case where the both sounds interfere with each other, the sound is heard in a muffled manner, and therefore it is desirable that the antiphase sound is not leaked.

In the second embodiment, in a case where the speaker 70 is attached to the housing back surface 64, it is possible to reflect sound by a peripheral object and transmit the sound toward a side of the front surface. In this case, when sound is generated toward an upper side from the speaker 70, the sound is able to pass through the upper side of the image forming apparatus 100, thus making it possible to inhibit the sound from being blocked by the image forming apparatus 100 itself.

In a case where the speaker 70 is attached to the housing side surface 62, the speaker 70 may be directed to the housing front surface 61 besides the upper side. That is, an angle of the front surface of the speaker 70 may be adjusted by arranging the angle deciding portions 81 having different lengths along the depth direction Y.

The structure in which the enclosure 90 is not included is illustrated in FIG. 5 described above, but the structure is not limited thereto and may be a structure in which the enclosure 90 is attached to the attachment guide 80 similarly to FIG. 7 also in the first embodiment.

Third Embodiment

Next, an image forming apparatus according to a third embodiment of the disclosure will be described with reference to the drawing. Note that, a structure of the image forming apparatus according to the third embodiment is substantially similar to that of the first embodiment or the second embodiment, and therefore description and a drawing thereof will be omitted.

Figure 8:
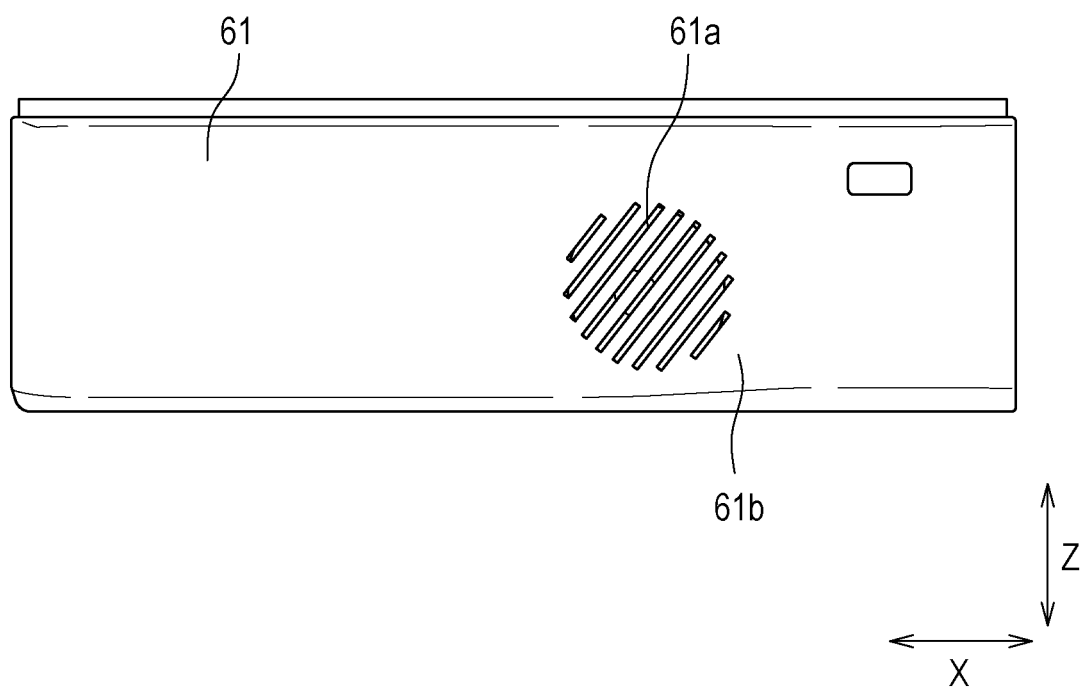
FIG. 8 is an enlarged front view illustrating a part of a housing front surface in a third embodiment of the disclosure on an enlarged scale.

FIG. 8 is an enlarged front view illustrating a part of a housing front surface in a third embodiment of the disclosure on an enlarged scale.

In the third embodiment, a direction of the sound hole 61a is different from that of the first embodiment. Specifically, the sound hole 61a has a longitudinal direction set to be inclined relative to the width direction X.

The sound hole 61a is set to be at a higher position in the height direction Z toward a side (right side in FIG. 8) of the operation panel 63. That is, in FIG. 8, the sound hole 61a is inclined so that a direction from the lower left to the upper right is the longitudinal direction thereof. According to such a structure, sound generated from the speaker 70 spreads over the sound hole 61a in the longitudinal direction and then is transmitted to the side of the operation panel 63, thus making it possible to reliably transmit the sound to a user who operates the operation panel 63. This is particularly effective in a case of a structure in which the housing front surface 61 is inclined so that a falling object is inhibited from entering into the inside through the sound hole 61a. In the present embodiment, though an inclined angle of the sound hole 61a is set to be 45 degrees, in a case where the sound hole 61a is close to the operation panel 63, the angle may be set to be greater than 45 degrees, for example, 70 degrees, and in a case where the sound holes 61a is away from the operation panel 63, the angle may be set to be smaller than 45 degrees, for example, 20 degrees.

That is, in the structure illustrated in FIG. 8, since an opening of the sound holes 61a is arranged to be inclined in the height direction Z compared to that in the structure of FIG. 3, sound is able to be more easily passed toward the upper side and more easily heard.

Note that, the embodiments disclosed herein are an example in all respects and shall not serve as a basis for a limited interpretation. Accordingly, the technical scope of the disclosure shall not be interpreted only by the aforementioned embodiments, but is defined on the basis of the description of the claims. Moreover, meanings equivalent to the claims and all modification falling in the scope of the claims are included.

The present disclosure contains subject matter related to that disclosed in Japanese Priority Patent Application JP 2017-230620 filed in the Japan Patent Office on Nov. 30, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus in which a speaker is stored inside a housing, the image forming apparatus comprising
    an attachment guide to which the speaker is attached on an inside surface of the housing, and
    an enclosure which encloses a back surface of the speaker, wherein
    the attachment guide has at least one angle deciding portion which inclines a front surface of the speaker relative to the inside surface of the housing, and is formed with a guide inside surface along an outer edge of the speaker, and is arranged inside housing front surface above a stacking tray,
    the enclosure has a contact portion and the contact portion engages with a guide outside of the attachment guide, and
    wherein a portion of the housing front surface corresponding to the attachment guide is inclined in the height direction so as to project outward in the horizontal direction.

2. The image forming apparatus according to claim 1, wherein
    the inside surface of the housing is formed with a plurality of sound holes penetrating from inside to outside at a position facing the front surface of the speaker.

3. The image forming apparatus according to claim 2, wherein
    the outside surface of the housing on which the attachment guide is provided is inclined so as to protrude to outside toward an upper side in a height direction.

4. The image forming apparatus according to claim 2, wherein
    each of sound holes has a rectangular shape in which any one side is formed to be longer than a side adjacent thereto.

5. The image forming apparatus according to claim 4, wherein
    each of sound holes has a longitudinal direction set to be inclined relative to a horizontal direction.

6. The image forming apparatus according to claim 1, wherein
    the front surface of the speaker is inclined so as to be separated from the inside surface of the housing toward an upper side in a height direction.

* * * * *